United States Patent
Sumiya et al.

[11] Patent Number: 5,912,217
[45] Date of Patent: Jun. 15, 1999

[54] DIAMOND SINTERED BODY AND A PROCESS FOR THE PRODUCTION OF THE SAME, TOOLS AND ABRASIVE GRAINS USING THE SAME

[75] Inventors: Hitoshi Sumiya; Shuichi Satoh; Takeru Nakashima; Yasuyuki Kanada, all of Itami, Japan

[73] Assignee: Sumitomo Electric Industries, Ltd., Osaka, Japan

[21] Appl. No.: 08/529,158

[22] Filed: Sep. 15, 1995

[30] Foreign Application Priority Data

| Sep. 16, 1994 | [JP] | Japan | 6-221938 |
| Sep. 16, 1994 | [JP] | Japan | 6-221939 |
| Sep. 16, 1994 | [JP] | Japan | 6-221940 |
| Apr. 27, 1995 | [JP] | Japan | 7-103534 |
| Aug. 30, 1995 | [JP] | Japan | 7-221546 |
| Aug. 30, 1995 | [JP] | Japan | 7-221547 |

[51] Int. Cl.$^6$ ............................................... B24D 3/02
[52] U.S. Cl. ........................ 51/307; 51/308; 51/309; 75/238; 75/344
[58] Field of Search ................. 51/307–309; 75/238, 75/244; 423/446, 299

[56] References Cited

U.S. PATENT DOCUMENTS

| 4,374,900 | 2/1983 | Hara et al. ............................. 428/551 |
| 5,248,317 | 9/1993 | Tank et al. ............................ 51/293 |

FOREIGN PATENT DOCUMENTS

| 2 324 222 | 5/1974 | Germany . | |
| 56-055536 | 5/1981 | Japan | C04B 35/52 |
| 56-084372 | 7/1981 | Japan | C04B 35/52 |
| 60-067078 | 4/1985 | Japan | B24D 3/14 |
| 1613458 | 12/1990 | U.S.S.R. | C08J 5/14 |

OTHER PUBLICATIONS

Database WPI, Section Ch, Week 8134, Derwent Publications Ltd., London, GB; Class E31, AN 81–61509D XP002019384& JP-A-56 084 372 (T. Kuratomi), Jul. 9, 1981 (abstract) & Chemical Abstracts, vol. 96, No. 2, Jan. 11, 1982, Columbus, Ohio, US (abstract No. 10782), T. Kuratomi: "Diamond sintered body" (abstract).

Patent Abstracts of Japan, vol. 9, No. 206 (M–406), Aug. 23, 1985 & JP-A-60 067078 (Fujikoshi K.K.), Apr. 17, 1985 (abstract) & Database WPI, section Ch, Week 8522, Derwent Publications Ltd., London, GB; Class L02, AN 85–130848 & JP-A-60 067 078 (Nachi Fujikoshi Corp.), Apr. 17, 1985 (abstract).

Database WPI, Section Ch, Week 9146, Derwent Publications Ltd., London, GB; Class A04, AN 91–337667 XP002019385 & SU-A-1 613 458 (P.V. Stribuk), Dec. 15, 1990 (abstract) & Chemical Abstracts, vol. 115, No. 2, Jul. 15, 1991, Columbus, Ohio, US; (abstract No. 10229), P.V. Stribuj et al.: "compositions for abrasive tools" (abstract).

Database WPI, Section Ch, Week 8127, Derwent Publications Ltd., London, GB; Class L02, AN 81–48594d XP002019386& JP-A-56 055 536 (Mitsui Mining & Smelting) (abstract) May 16, 1981.

*Primary Examiner*—Deborah Jones
*Attorney, Agent, or Firm*—Wenderoth, Lind & Ponack

[57] ABSTRACT

An improved diamond sintered body having an excellent breakage resistance, corrosion resistance, heat resistance and wear resistance and capable of being sintered at a relatively low pressure and low temperature can be provided. The feature thereof consists in a diamond sintered body comprising 50 to 99.9 volume % of diamond and the balance of a binder phase consisting of a single or mixed phase of a compound (C) or composite (C') of at least one element (A) selected from the group consisting of rare earth elements, Group 3B, 4A, 4B and 6B elements of Periodic Table, iron group, Mn, V, alkali metals and alkaline earth metals with a phosphorus compound (B), or of the above described compound (C) or composite (C') with an oxide of (A).

36 Claims, No Drawings

DIAMOND SINTERED BODY AND A PROCESS FOR THE PRODUCTION OF THE SAME, TOOLS AND ABRASIVE GRAINS USING THE SAME

BACKGROUND OF THE INVENTION

1. Field of the Invention

This invention relates to a diamond sintered body, a process for the production of the same and a tool for cutting or excavating using the diamond sintered body. The diamond sintered body of the present invention is preferably applied to tool materials for cutting or polishing of non-ferrous metals or ceramics, edge materials of drill bits for excavating petroleum or abrasive grains obtained through pulverizing.

2. Description of the Prior Art

Synthetic diamond sintered bodies or materials of the prior art can be classified in three types, depending on sintering materials used:

① obtained by the use of iron group metals (Fe, Ni, Co) and/or alloys thereof each having a solvent effect, as a sintering binder, ② obtained by the use of silicon carbide (SiC) as a sintering binder and ③ obtained by the use of a carbonate having a catalytic action as a sintering binder (Japanese Patent Laid-Open Publication Nos. 74766/1992 and 114966/1992).

Type ③ needs sintering at a higher temperature and pressure as compared with Types ① and ②, resulting in a considerably higher production cost and accordingly, almost all commercially available ones are Types ① and ② using the ferrous metals or alloys thereof, and silicon carbide.

In addition to the above described, there are natural diamond sintered bodies (carbonade), which are not actually used on a commercial scale because the origins thereof are not clear, dispersion of the quality is large and the outputs thereof are very small.

The above described synthetic diamond sintered bodies of the prior art have the following problems:

(a) In the case of the sintered bodies ① obtained by the use of iron group metals and/or alloys thereof, the diamond is reacted with the binder material to lower the strength when the temperature is raised to 700° C. or higher and the wear resistance or strength is lowered because of use of the metal as a sintering binder.

(b) In the case of the sintered bodies ② obtained by the use of silicon carbide as a sintering binder, the breakage resistance is inferior because of use of the breakable carbide as a binder material and binding of diamond grains with each other is decreased so that the wear reistance is inferior because of use of silicon carbide free from the solvent action and catalytic action for diamond.

(c) In the case of the sintered bodies ③ obtained by the use of a carbonate as a sintering binder material, the pressure and temperature at which the carbonate exhibits catalytic action are high and the sinterable volume is more decreased as compared with the above described sintered bodies ① and ②, the cost of the sintered body per unit volume is very high because of a higher sintering cost at an ultrahigh pressure, and the binding strength of diamond grains with each other is so weak that the breakage resistance is inferior, because the carbonate has a relatively small catalytic action and solvent action.

(d) In the case of immersing the above described sintered body ① in an acid to remove the iron group metals or their alloys, the strength and breakage resistance are both low and use thereof is limited to that at a high temperature.

As described above, the diamond sintered body of the prior art meets with at least two problems of i) inferior heat resistance, ii) inferior breakage resistance, iii) inferior wear resistance and iv) needing a high temperature and high pressure by sintering to result in a higher cost.

A diamond sintered body using an iron group metal such as Co, functioning as a catalyst capable of accelerating graphitization of diamond, has inferior heat resistance. Namely, the diamond is graphitized at about 700° C. in an inert gas atmosphere. Moreover, this sintered body does not have such a high strength and tends to be broken because of the presence of the metal such as Co in the grain boundary of diamond grains, as a continuous phase, and there arises a problem that thermal deterioration tends to occur due to difference in thermal expansion between the metal and diamond.

In order to raise the heat resistance, it has been proposed to remove the metal in the above described grain boundary by an acid treatment. Thus, the heat resistance temperature is improved to about 1200° C., but the strength is largely lowered by about 30% because the sintered body becomes porous.

A diamond sintered body using SiC as a binder material is excellent in heat resistance, but exhibits a low strength because of the absence of binding of the diamond grains with each other.

On the other hand, a diamond sintered body using a carbonate as a sintering aid is excellent in heat resistance and has a relatively high strength, but for the production thereof, severe pressure and temperature conditions, for example, at least 7.7 GPa and 2000° C. are required, so that it is difficult to produce it on a commercial scale and it has not been put to practical use. Since carbonates have a lower catalytic capacity and less solubilizing and depositing action of diamond, as compared with the iron group metals of the prior art, furthermore, binding of diamond grains with each other is insufficient, resulting in inferior breakage resistance.

SUMMARY OF THE INVENTION

It is an object of the present invention to provide a diamond sintered body having excellent heat resistance, breakage resistance and wear resistance, which can be synthesized at a relatively low pressure and temperature, whereby the above described problems of the prior art can be solved.

It is another object of the present invention to provide a process for the production of a diamond sintered body having excellent heat resistance, breakage resistance and wear resistance.

It is a further object of the present invention to provide a tool for cutting, polishing or excavating using the diamond sintered body.

It is a still further object of the present invention to provide abrasive grains obtained through pulverizing of the diamond sintered body.

These objects can be attained by a diamond sintered body comprising 50 to 99.9 volume % of diamond and the balance of a binder phase consisting of a single or mixed phase of a compound (C) or composite (C') of at least one element (A) selected from the group consisting of rare earth elements, Group 3A, 3B, 4A, 4B and 6B elements of Periodic Table (IUPAC), iron group metals, Mn, V, alkali metals and alkaline earth metals with a phosphorus compound (B), or of the above described compound (C) or composite (C') with an oxide of (A).

DETAILED DESCRIPTION OF THE INVENTION

The inventors have made various efforts to solve the problems of the prior art and develop a diamond sintered body having excellent heat resistance, breakage resistance and wear resistance, which can be synthesized at a relatively low pressure and temperature, and consequently, have reached the following inventions and embodiments:

(1) A diamond sintered body comprising 50 to 99.9 volume %, preferably 50 to 99.5 volume %, more preferably 70 to 99 volume % of diamond and the balance of a binder phase consisting of a single or mixed phase of a compound (C) or composite (C') of at least one element (A) selected from the group consisting of rare earth elements, Group 3A, 3B, 4A, 4B and 6B elements of Periodic Table, iron group, Mn, V, alkali metals and alkaline earth metals with a phosphorus compound (B), or of the above described compound (C) or composite (C') with an oxide of (A).

(2) A diamond sintered body comprising 50 to 99.9 volume %, preferably 50 to 99.5 volume %, more preferably 70 to 99 volume % of diamond and the balance of a binder phase predominantly consisting of a material obtained from a rare earth element and a phosphorus compound.

(3) A process for the production of the diamond sintered body, as described in the above described (1) or (2), which comprises mixing a powder of at least one element (A) selected from the group consisting of rare earth elements, Group 3A, 3B, 4A, 4B and 6B elements of Periodic Table, iron group metals, Mn, V, alkali metals and alkaline earth metals, a powder of at least one oxide of the element (A) or at least one compound (D) containing the element (A), a powder of phosphorus or at least one phosphorus compound (B) and a powder of diamond or graphite, maintaining and sintering the resulting mixed powders under pressure and temperature conditions in the thermodynamically stable region of diamond.

(4) A process for the production of the diamond sintered body, as described in the above described (1) or (2), which comprises previously synthesizing a compound (C) of at least one element (A) selected from the group consisting of rare earth elements, Group 3A, 3B, 4A, 4B and 6B elements of Periodic Table, iron group metals, Mn, V, alkali metals and alkaline earth metals with at least one phosphorus compound (B) or a composite of the compound (C) and at least one oxide of the element (A), mixing a powder of the compound (C) or composite with a powder of diamond or graphite, maintaining and sintering the resulting mixed powders under pressure and temperature conditions in the thermodynamically stable region of diamond.

(5) A process for the production of the diamond sintered body, as described in the above described (1) or (2), which comprises previously preparing a thin piece, thin sheet or sintered body holding plate consisting of the compound (C) of at least one element (A) selected from the group consisting of rare earth elements, Group 3A, 3B, 4A, 4B and 6B elements of Periodic Table, iron group metals, Mn, V, alkali metals and alkaline earth metals with at least one phosphorus compound (B) or a composite of the compound (C) and at least one oxide of the element (A), combining a powder of diamond or graphite with the thin piece, thin sheet or sintered body holding plate and subjecting the resulting assembly to infiltration under pressure and temperature conditions in the thermodynamically stable region of diamond, thereby sintering the diamond.

(6) A process for the production of the diamond sintered body, as described in the above described (1) or (2), which comprises mixing a rare earth element powder or an alloy powder containing at least one rare earth element, a phosphorus compound and diamond powder or a non-diamond carbon powder or a mixture of diamond and non-diamond carbon powders and maintaining and sintering the resulting mixed raw materials under pressure and temperature conditions in the thermodynamically stable region of diamond.

(7) A process for the production of the diamond sintered body, as described in the above described (1) or (2), which comprises previously synthesizing a compound from a rare earth element and phosphorus compound, mixing a powder of the resulting compound with diamond powder or a non-diamond carbon powder or a mixture of diamond and non-diamond carbon powders and maintaining and sintering the resulting mixed raw materials under pressure and temperature conditions in the thermodynamically stable region of diamond.

(8) A process for the production of the diamond sintered body, as described in the above described (1) or (2), which comprises laminating a shaped body of a rare earth element powder or an alloy powder containing at least one rare earth element and a phosphorus compound powder and a shaped body of diamond powder or a non-diamond carbon powder or a mixture of diamond and non-diamond carbon powders and maintaining and sintering the resulting laminate under pressure and temperature conditions in the thermodynamically stable region of diamond.

(9) A process for the production of the diamond sintered body, as described in the above described (1) or (2), which comprises previously synthesizing a compound from a rare earth element and phosphorus compound, laminating a shaped body of the resulting compound powder and a shaped body of diamond powder or a non-diamond carbon powder or a mixture of diamond and non-diamond carbon powders and maintaining and sintering the resulting laminate under pressure and temperature conditions in the thermodynamically stable region of diamond.

(10) The diamond sintered body, as described in the above described (1), wherein the phosphorus compound (B) is represented by $P_aO_b$ in which a is 1 or 2 and b is 2, 3, 4, 5 or 7.

(11) The diamond sintered body, as described in the above described (1), wherein the compound (C) or composite (C') is represented by $MN_x(P_aO_b)_y(OH)_z$ in which M is a simple substance or solid solution of at least one element selected from the group consisting of rare earth elements, alkaline earth elements and 4B elements of Periodic Table and N is a simple substance or solid solution of at least one element selected from the group consisting of Group 3B elements of Periodic Table and sulfur, and x, y and z are respectively in the range of $1 \leq x \leq 4.5$, $1 \leq y \leq 5$ and $1 \leq z \leq 26$.

(12) The diamond sintered body, as described in the above described (1), (2), (10) or (11), wherein the binder phase is composed of a compound (C) or composite (C') of at least one element (A) selected from the group consisting of rare earth elements, Group 3A, 3B, 4A, 4B and 6B elements of Periodic Table, iron group metals, Mn, V, alkali metals and alkaline earth metals with a phosphorus compound (B) represented by $P_aO_b$, in which a is 1 or 2 and b is 2, 3, 4, 5 or 7 and an oxide of at least one element (A) selected from the group consisting of rare earth elements, Group 3A, 3B, 4A, 4B and 6B elements of Periodic Table, iron group metals, Mn, V, alkali metals and alkaline earth metals.

(13) The diamond sintered body, as described in the above described (1), (2), (10) or (11), wherein the binder phase is composed of a compound (C) or composite (C') represented by $MN_x(P_aO_b)_y(OH)_z$ in which M is a simple substance or solid solution of at least one element selected from the group consisting of rare earth elements, alkaline earth elements and 4B elements of Periodic Table and N is a simple substance or solid solution of at least one element selected from the group consisting of Group 3B elements of Periodic Table and sulfur, and x, y and z are respectively in the range of $1 \leq x \leq 4.5$, $1 \leq y \leq 5$ and $1 \leq z \leq 26$, with an oxide of at least one element (A) selected from the group consisting of rare earth elements, Group 3A, 3B, 4A, 4B and 6B elements of Periodic Table, iron group metals, Mn, V, alkali metals and alkaline earth metals.

(14) A diamond sintered body comprising 50 to 99.9 volume %, preferably 50 to 99.5 volume %, more preferably 70 to 99 volume % of diamond and the balance of a binder phase predominantly consisting of a material obtained from a phosphorus compound and carbonate compound.

(15) The diamond sintered body, as described in the above described (14), wherein the binder phase is composed of a mixed phase consisting of a material obtained from a phosphorus compound and carbonate compound, and an oxide.

(16) The diamond sintered body, as described in the above described (14) or (15), wherein the binder phase is composed of a mixed phase consisting of a phosphorus-carbonate compound or phosphorus oxide-carbonate compound, obtained from a phosphorus compound and carbonate compound, and an oxide.

(17) The diamond sintered body, as described in any one of the above described (14) to (16), wherein the phosphorus compound contains at least one of rare earth elements, alkali metals, alkaline earth metals, Group 3B, 4B and 6B elements of Periodic Table.

(18) The diamond sintered body, as described in any one of the above described (14) to (16), wherein the carbonate compound contains at least one of rare earth elements, alkali metals, alkaline earth metals, Mn and V.

(19) The diamond sintered body, as described in any one of the above described (14) or (15), wherein the material obtained from the phosphorus compound and carbonate compound contain at least one of rare earth elements, alkali metals, alkaline earth metals, Group 3B, 4B and 6B elements of Periodic Table.

(20) The diamond sintered body, as described in any one of the above described (15) or (16), wherein the oxide contains at least one of rare earth elements, alkali metals, alkaline earth metals, Group 3B, 4B, 6B and 4A elements of Periodic Table, iron group metals, Mn and V.

(21) The diamond sintered body, as described in any one of the above described (14), (15), (16) or (19), wherein the material obtained from the phosphorus compound and carbonate compound is an apatite represented by $M_x[N_yCO_3(P_aO_b)_z]$ in which M is a single element or solid solution of at least one element selected from the group consisting of rare earth elements, alkali elements, alkaline earth elements, Pb, Mn and V, and N is at least one element or oxide, selected from the group consisting of rare earth elements, Group 3B, 4B and 6B elements of Periodic Table and oxides of Group 4A elements of Periodic Table or oxides of metallic elements, and x, y and z are respectively in the range of $1 \leq x \leq 7$, $1 \leq y \leq 6$, and $1 \leq z \leq 6$, a is 1 or 2 and b is 2, 3, 4, 5 or 7.

(22) A process for the production of the diamond sintered body, as described in any one of the above described (14) to (21), which comprises mixing at least one member selected from the group consisting of phosphorus compound powders, carbonate compound powders, phosphorus-carbonate compound powders and phosphorus oxide-carbonate compound powders, at least one oxide powder and diamond powder, and sintering the resulting mixed powders, as a raw material powder, under pressure and temperature conditions in the thermodynamically stable region of diamond.

(23) A process for the production of the diamond sintered body, as described in any one of the above described (14) to (21), which comprises previously preparing a compound or mixture consisting of at least one member selected from the group consisting of phosphorus compounds, carbonate compounds, phosphorus-carbonate compounds and phosphorus oxide-carbonate compounds and at least one oxide powder, converting it into a powder, mixing the resulting powder and diamond powder, and sintering the resulting mixed powders, as a raw material powder, under pressure and temperature conditions in the thermodynamically stable region of diamond.

(24) A process for the production of the diamond sintered body, as described in any one of the above described (14) to (21), which comprises mixing at least one member selected from the group consisting of phosphorus compound powders, carbonate compound powders, phosphorus-carbonate compound powders and phosphorus oxide-carbonate compound powders and at least one oxide powder to prepare mixed powders, or previously preparing a compound or mixture consisting of at least one member selected from the group consisting of phosphorus compounds, carbonate compounds, phosphorus-carbonate compounds and phosphorus oxide-carbonate compounds and at least one oxide, converting it into a powder, preparing a thin piece, thin sheet or sintered body holding plate from the mixed powders or the powder, and combining a powder of diamond or graphite with the thin piece, thin sheet or sintered body holding plate and subjecting the resulting assembly to infiltration under pressure and temperature conditions in the thermodynamically stable region of diamond, thereby sintering the diamond. (25) A diamond sintered body comprising 0.1 to 30 volume % of a material consisting of a compound containing Group 3 element of Periodic Table and phosphorus and the balance of diamond.

(26) The diamond sintered body, as described in the above described (25), wherein the compound containing Group 3 element of Periodic Table and phosphorus is a compound consisting of an oxide of Group 3 element of Periodic Table and phosphorus oxide.

(27) The diamond sintered body, as described in the above described (25), wherein the compound containing Group 3 element of Periodic Table and phosphorus is a phosphate of Group 3 element of Periodic Table.

(28) The diamond sintered body, as described in any one of the above described (25) to (27), wherein Group 3 elements of Periodic Table are B, Al and Y.

(29) A process for the production of the diamond sintered body, as described in any one of the above described (25) to (28), which comprises using a phosphate of Group 3 of Periodic Table in the form of a powder, as a sintering agent, mixing a powder of the phosphate with diamond powder or a non-diamond carbon powder or a mixture of diamond and non-diamond carbon powders and maintaining and sintering the resulting mixed powders under pressure and temperature conditions in the thermodynamically stable region of diamond.

(30) A process for the production of the diamond sintered body, as described in any one of the above described (25) to (28), which comprises laminating a shaped body of a powder of a phosphate of Group 3 element of Periodic Table, used as a sintering agent, and a shaped body of diamond powder or a non-diamond carbon powder or a mixture of diamond and non-diamond carbon powders and maintaining and sintering the resulting laminate under pressure and temperature conditions in the thermodynamically stable region of diamond.

(31) The process for the production of the diamond sintered body, as described in the above described (29) or (30), wherein the phosphate is a phosphate hydrate, hydrogenphosphate or hydrogenphosphate hydrate.

(32) The process for the production of the diamond sintered body, as described in the above described (29) or (30), wherein a mixture of an oxide of Group 3 element of Periodic Table and phosphorus oxide is used as a sintering agent.

(33) The process for the production of the diamond sintered body, as described in the above described (29) or (30), wherein a mixture of an oxide of Group 3 element of Periodic Table and a phosphate of Group 3 element of Periodic Table is used as a sintering agent.

(34) The process for the production of the diamond sintered body, as described in any one of the above described (29) to (33), wherein Group 3 element is boron, aluminum or yttrium.

(35) A diamond sintered body tool for cutting, polishing and excavating, characterized by the use of the diamond sintered body as described in the foregoing items or the diamond sintered body obtained by the process as described in the foregoing items as an edge.

(36) Abrasive grains obtained by pulverizing the diamond sintered body as described in the foregoing items or the diamond sintered body obtained by the process as described in the foregoing items.

The present invention is based on finding that phosphorus compounds each containing at least one element (A) selected from the group consisting of Group 3A, 3B, 4A, 4B and 6B elements of Periodic Table, iron group elements, Mn, V, alkali metals, rare earth elements and alkaline earth elements are very effective as a sintering binder for a diamond sintered body.

In the above item (1), the binder phase can either be amorphous or crystalline and the composite (C') includes mixed compounds, solid solutions, mixed or composite oxides, each containing further compounds in addition to the phosphorus compounds.

A preferable form of the phosphorus compound capable of showing a sintering action of diamond is represented by $P_aO_b$ and when a is 1 or 2 and b is 2, 3, 4, 5 or 7 in this formula, better results can be obtained. It is also found that a composition strongly functioning as a binder material is represented by $MN_x(P_aO_b)_y(OH)_z$, in which M is a simple substance or solid solution of at least one element selected from the group consisting of rare earth elements, alkaline earth elements and 4B elements of Periodic Table and N is a simple substance or solid solution of at least one element selected from the group consisting of Group 3B elements of Periodic Table and sulfur, and x, y and z are respectively in the range of $1 \leq x \leq 4.5$, $1 \leq y \leq 5$ and $1 \leq z \leq 26$, which effectively acts even in the coexistence with various compounds or oxides in combination.

In a preferable embodiment of the present invention, there is provided a diamond sintered body comprising 50 to 99.9 volume %, preferably 50 to 99.5 volume %, more preferably 70 to 99 volume % of diamond and the balance of a binder phase obtained from a rare earth element and phosphorus compound, characterized by the use of a mixture or compound consisting of the rare earth element and phosphorus compound.

Functioning of rare earth elements, phosphorus compounds and others in the present invention will now be illustrated.

a) Addition effect of rare earth elements

A rare earth element functions as a solvent for dissolving carbon and accelerates sintering of diamond. When using rare earth elements in the form of a single element or an alloy of a rare earth metal and ferrous metal as a sintering binder material, however, they react with diamond to form carbides which hinder the sintering action of diamond grains.

b) Addition effect of phosphorus compounds

On the other hand, a phosphorus compound has an action of preventing rare earth elements from being carburized in addition to the catalytic or solubilizing action in diamond synthesis and assists the solubilizing action of rare earth elements.

Therefore, it is assumed that the coexistence of a rare earth element and phosphate in a sintering binder is preferable for sintering of diamond, but an X-ray diffraction teaches that a mixture of a rare earth element and phosphate is dissolved in the stable region of diamond and finally changed almost in a compound thereof under normal pressure.

Such a compound of a rare earth element and phosphate is hardly etched or corroded with an acid or alkali and has an advantage such that when it is used as a binder, such a high pressure and temperature are not required as in the case of carbonates. However, the carbon of diamond partly reacts with the compound to form carbides, carbonate compounds or mixtures thereof in some cases, but this results in no substantial influences.

c) Addition effect of alkaline earth metals, Group 3B and 4B elements of Periodic Table and sulfur These elements respectively have a low catalytic action for the synthesis of diamond, but have an effect of lowering the melting point of the binder and thus sintering diamond at a relatively low pressure and low temperature. That is, the production cost of a diamond sintered body can largely be decreased, thus resulting in a large commercial benefit, by producing it at a relatively low pressure and low temperature.

d) Advantage obtained by using phosphorus compounds as a binder phase

The first advantage is that the phosphorus compound is excellent in chemical resistance as well as strength and does not deteriorate the binder. In particular, this advantage is larger in excavating or cutting in a corrosive environment.

The phosphorus compound has a thermal expansion coefficient of $5 \times 10^{-6}$, closer to a thermal expansion coefficient of $2 \sim 3 \times 10^{-6}$ of diamond, and accordingly, no thermal stress occurs in a sintered body even if it is used at a high temperature, resulting in an excellent heat resistance.

The second advantage is that the melting point of the binder phase is lowered and sintering at a low temperature is thus rendered possible. Similar advantages can be obtained in any case, i.e. by composing the binder phase of a single compound or a plurality of compounds.

e) Shape effect of phosphorus compounds

Generally, phosphorus oxides can be represented by $P_aO_b$. The inventors have found that a number of phosphoric acids, in which a and b satisfy the following conditions, have a solubilizing action and serve to sinter diamond, a=1 or 2 and b=2, 3, 4, 5 or 7

It is further found that in addition to orthophosphoric acid, hypophosphoric acid ($H_3PO_2$) is also effective, for example, as $Ce(H_3PO_2)_3 \cdot H_2O$, etc. and metaphosphoric acid ($HPO_3$) effectively acts. Moreover, polyphosphoric acids such as pyrophosphoric acid, triphosphoric acid, trimetaphosphoric acid, tetraphosphoric acid, etc. can effectively be used.

f) Effect of compounds represented by $MN_x(P_aO_b)_y(OH)_z$

A compound of $MN_x(P_aO_b)_y(OH)_z$ in which M is Ce and N is Al is known as $CeAl_3(PO_4)_2(OH)_6$ (florencite). The first effect obtained by the use of the compound for the binder phase is that the compound has such a low melting point that diamond can be sintered at a lower temperature by 300 to 400° C. as compared with the carbonate catalyst of the prior art and the pressure can largely be decreased by 1 GPa (10000 atm) or more. The production at such a low pressure and low temperature largely contributes to reduction of the production cost of the sintered body and provision of an inexpensive product.

The above described compound is strongly resistant to acids and alkalies and excellent in corrosion resistance so that it is suitable for use in an edge of a drill bit for excavating petroleum.

The compound of $MN_x(P_aO_b)_y(OH)_z$ is particularly useful when M is a simple substance or solid solution of at least one element selected from the group consisting of rare earth elements, alkaline earth elements and 4B elements of Periodic Table and N is a simple substance or solid solution of at lease one element selected from the group consisting of Group 3B elements (Al, B, Ga, In, Tl) of Periodic Table and sulfur, and x, y and z are respectively in the range of $1 \leq x \leq 4.5$, $1 \leq y \leq 5$ and $1 \leq z \leq 26$.

When the compound is dispersed in an oxide, similar effects to those described above can be given.

g) Addition effect of carbonate

A carbonate acts as not only a solvent for the synthesis of diamond, but also a reagent for lowering the melting point of the binder phase and synthesis temperature of diamond through coexistence with a phosphorus compound or formation of a compound. In addition, the carbonate has an effect of lowering or moderating carburization of the rare earth elements, etc.

h) Addition effect of compounds containing alkali metal elements, alkaline earth elements, Group 3B, 4B and 6B elements of Periodic Table The first effect is that the above described compound is excellent in chemical resistance as well as strength and does not deteriorate the binder. In particular, this advantage is larger in excavating or cutting in a corrosive environment.

The phosphorus compound has a thermal expansion coefficient of $5 \times 10^{-6}$, closer to a thermal expansion coefficient of $2 \sim 3 \times 10^{-6}$ of diamond, and accordingly, no thermal stress occurs in a sintered body even if it is used at a high temperature, resulting in an excellent heat resistance.

The second effect is that the melting point of the binder phase is lowered and sintering at a low temperature is thus rendered possible. Similar effects can be obtained in any case, i.e. by composing the binder phase of a single compound or a plurality of compounds.

i) Addition effect of oxides, in particular, oxides of alkali metal elements, alkaline earth elements, Group 3A, 3B, 4B and 6B elements of Periodic Table, iron group metals, Group 4A elements of Periodic Table, Mn and V The addition effect of these oxides consists in lowering the sintering temperature and improving the corrosion resistance or strength of the binder phase.

j) Effect by presence of apatite represented by $M_x[N_yCO_3(P_aO_b)_z]$ in binder phase The first effect obtained by the use of this compound for the binder phase is that this compound has such a low melting point that diamond can be sintered at a lower temperature by about 500 to 600° C. as compared with the carbonate catalyst of the prior art and the pressure can largely be decreased by 1.5 GPa (15000 atm) or more. The production at such a low pressure and low temperature largely contributes to reduction of the production cost of the sintered body and provision of an inexpensive product.

The above described compound is strongly resistant to acids and alkalies and excellent in corrosion resistance so that it is suitable for use in an edge of a drill bit for excavating petroleum.

The inventors have found that the compound of $M_x[N_yCO_3(P_aO_b)_z]$ is formed when M is a simple substance or solid solution of at least one element selected from the group consisting of rare earth elements, alkali elements, alkaline earth elements, Pb, Mn and V, and N is a compound containing at least one element or oxide, selected from the group consisting of rare earth elements, Group 3B, 4B, 6B and 4A elements Periodic Table and oxides of these elements and metallic elements and $1 \leq x \leq 7$, $1 \leq y \leq 6$ and $1 \leq z \leq 6$.

The components and compounds in the sintered material of the present invention will further be illustrated:

In the present invention, in at least one element (A) selected from the group consisting of rare earth elements, Group 3A, 3B, 4A, 4B and 6B elements of Periodic Table, iron group metals, Mn, V, alkali metals and alkaline earth metals, firstly, the rare earth elements include lanthanoids such as La, Ce, Pr, Nd, Pm, Sm, Eu, Gd, Tb, Dy, Ho, Er, Tm, Yb and Lu, and actinoids such as Ac, Th, Pa, U, Np, Pu, Am, Cm, Bk, Cf, Es, Fm, Md, No and Lr.

The rare earth elements can be incorporated in alloys, for example, as CeTl, CeIn, AlCe, LaGe, etc.

As Group 3A elements of Periodic Table in the element (A), there are used Sc and Y, as Group 3B elements of Periodic Table, there are used Al, Ga, In and Tl and as Group 4B elements of Periodic Table, there are used Si, Ge, Sn and Pb. Oxides of these elements can also be used. As Group 4A elements of Periodic Table, there are used Ti, Zr and Hf and as Group 6B elements of Periodic Table, there are used S, Se, Te and Po. Oxides of these elements can also be used.

As the alkali elements, there are used Li, Na, K, Cs, Rb and Fr, and as the alkaline earth elements, there are used Be, Mg, Ca, Sr, Ba and Ra.

The compound (D) containing the element (A) includes, for example, hydroxides, hydrides, hydrates, etc. of the element (A).

The phosphorus compound (B) used in the present invention includes, for example, phosphorus oxides or phosphoric acids such as $P_2O$, $P_2O_3$, $P_2O_4$, $P_2O_5$, $H_3PO_4$, etc., K, Na, Ba and Ca salts such as $K_3PO_4$, $K_2HPO_4$, $KH_2PO_4$, $Na_2HPO_4 \cdot nH_2O$, $Ba_3(PO_4)_2$, $BaHPO_4$, $Ca(H_2PO_4)_2$, etc. and other salts such as those of Li, Rb, Cs, Fr, Be, Mg, Sr, Ra, Re, Rn, Os, Co, Rh, Ir, Ni, Pd, Pt and Pb.

The carbonate compound used in the present invention includes, for example, $CaCO_3$, $SrCO_3$, $BaCO_3$, $MgCO_3$, $Na_2CO_3$, $K_2CO_3$, $Li_2CO_3$, $Cs_2CO_3$, $NaHCO_3$, $KHCO_3 \cdot 2H_2O$, $LiHCO_3$, $CsHCO_3$, $La_2(CO_3)_2$, $Ce_2(CO_3)_2$, $Nd_2(CO_3)_2$, $Gd_2(CO_3)_2$, $Eu_2(CO)_2$, etc.

Alkali metal elements, alkaline earth elements and rare earth elements which can be incorporated in the carbonate compound of the present invention are the same as those described above.

The oxide used in the present invention includes oxides of rare earth elements, alkali metals, alkaline earth metals, Group 3A, 3B, 4B and 6B elements of Periodic Table, iron group metals, 4A elements of Periodic Table, Mn and V and the iron group metal includes Fe, Co and Ni. Group 4A elements of Periodic Table are Ti, Zr, Hf, etc.

As described above, the binder phase in the diamond sintered body of the present invention is composed of a single or mixed phase of a compound (C) or composite (C') of an element (A) with a phosphorus compound (B), or of the above described compound (C) or composite (C') with an oxide of (A).

Examples of $MN_x(P_aO_b)_y(OH)_z$ in the present invention include, for example, $CeAl_3(PO_4)_2 \cdot (OH)_6$, $LaAl_2Ga(PO_4)_2 \cdot (OH)_4$, $NdAlTl_2(PO_4)_2 \cdot (OH)_6$, etc.

As described above, the binder phase in the diamond sintered body of the present invention is composed of a single or mixed phase of a phosphorus type compound, carbonate type compound, a compound or composite of a phosphorus type compound and carbonate type compound, or the above described compound or composite with a metal oxide, etc.

Examples of $M_x[N_yCO_3(P_aO_b)_z]$ are $Ca_2Ce_2(CO_3)_2(PO_4)_2$, $Sr_2La_2(CO_3)(P_2O_7)$, $Ba_4Nd(CO_3)(PO_4)_3$, $Mg_5La(CO_3)_2(PO_4)_3$, $Ca(CeO_2)(CO_3)(P_2O_5)$, $Na_2(La_2O_3)(CO_3)(P_2O_5)_2$, $Ce_2Al(CO_3)_3(H_2PO_2)_3$, $La_2Ce_2(CO_3)_3(PO_4)_2$, $Ce_3(SiO_2)(CO_3)_2(PO_4)$, etc.

In the material obtained from a rare earth element and phosphorus compound according to the present invention, the mole ratio of the rare earth element and phosphorus is preferably 0.01 to 0.99. In the diamond sintered body of the present invention, the material obtained from a rare earth element and phosphorus compound includes rare earth elements, rare earth element compounds, phosphorus compounds, compounds containing rare earth elements and phosphorus and solid solutions or composites of rare earth elements, phosphorus compounds, and compounds containing rare earth elements and phosphorus.

Examples of the above material are $Ce_3(PO_4)_4$, $CePO_4 \cdot nH_2O$, $Ce_2O_3 \cdot 2P_2O_4$, $La_2O_3 \cdot 3P_2O_5$, $Ce_2O_3 \cdot 5P_2O_5$, $Nd_4(P_2O_7)_3 \cdot 12H_2O$, $NdHP_2O_7 \cdot 3H_2O$, $NdP_2O_7 \cdot 7H_2O$, $4LaO_2 \cdot 3P_2O_5 \cdot 26H_2O$, $La(H_2PO_2)_3 \cdot nH_2O$, $Ho_3(PO_4)_4 \cdot nH_2O$, $3HoO_2 \cdot P_2O_5 \cdot 3H_2O$, $LuPO_4 \cdot nH_2O$, etc.

In a further preferred embodiment of the present invention, the feature consists in that as a sintering agent for the diamond sintered body, there are used phosphates of Group 3 elements of Periodic Table or hydrates thereof, hydrogenphosphates of Group 3 elements of Periodic Table or hydrates thereof, mixtures of oxides of Group 3 elements of Periodic Table and phosphorus oxides and mixtures of oxides of Group 3 elements of Periodic Table and phosphates of Group 3 elements of Periodic Table. In the present specification, "Group 3 elements" mean both Group 3A and Group 3B elements.

The phosphate of Group 3 elements of Periodic Table includes, for example, $BPO_4$, $AlPO_4$, $Tl_3PO_4$, $YPO_4$, etc. The hydrate of the phosphate, for example, in the case of $AlPO_4$, includes $AlPO_4 \cdot nH_2O$ (n=½, 2, 3, 4, etc.). As the hydrogenphosphate, for example, $Al(H_2PO_4)_3$ is used and as the hydrogenphosphate hydrate, $Al(H_2PO_4)_3 \cdot \frac{3}{2}H_2O$ is used.

As the mixtures of oxides of Group 3 elements of Periodic Table and phosphorus oxides, for example, there can be used mixtures of $B_2O_3$ and $P_2O_5$, $Al_2O_3$ and $P_2O_5$, $Y_2O_3$ and $P_2O_5$, etc. In addition, mixtures of two or more oxides of Group 3 elements of Periodic Table and phosphorus oxide, for example, mixtures of $Al_2O_3$, $Y_2O_3$ and $P_2O_5$ can also be used.

As the mixtures of oxides of Group 3 elements of Periodic Table and phosphates of Group 3 elements of Periodic Table, for example, there can be used mixtures of $B_2O_3$ and $AlPO_4$, $Al_2O_3$ and $YPO_4$ and $Y_2O_3$ and $YPO_4$. In addition, mixtures of two or more oxides of Group 3 elements of Periodic Table and phosphates, for example, mixtures of $Al_2O_3$, $Y_2O_3$ and $YPO_4$ can also be used.

These phosphates of Group 3 elements of Periodic Table or hydrates thereof, hydrogenphosphates of Group 3 elements of Periodic Table or hydrates thereof, mixtures of oxides of Group 3 elements of Periodic Table and phosphorus oxides and mixtures of oxides of Group 3 elements of Periodic Table and phosphates of Group 3 elements of Periodic Table respectively exhibit strong catalytic actions for diamond. Thus, in each case, a matrix composed of diamond grains very strongly bonded with each other is formed. Abnormal grain growth hardly takes place to result in a sintered body with a uniform structure. Consequently, a diamond sintered body having higher strength and more excellent breakage resistance can be given than that of the prior art.

The thus obtained diamond sintered body is characterized by containing a material consisting of a compound containing Group 3 element of Periodic Table and phosphorus, a compound consisting of an oxide of Group 3 element and phosphorus oxide or a phosphate of Group 3 element. When Group 3 element of Periodic Table is Y, for example, such a material includes yttrium phosphates such as $YPO_4$, $Y_8P_2O_{17}$, $Y_5PO_{10}$, $Y_4P_2O_{11}$, $Y_3PO_7$, $Y_2P_4O_{13}$, $YP_3O_9$, $YP_5O_{14}$, etc. and composite compounds of these yttrium phosphates with yttrium oxide such as $Y_2O_3$ or phosphorus oxide such as $P_2O_5$. These materials are stable at a high temperature, e.g. about 1000° C., so that the diamond sintered body of the present invention can also give a very excellent heat resistance.

Since the phosphate hydrates of Group 3 elements of Periodic Table, hydrogenphosphates or hydrogenphosphate hydrates and mixtures of oxides of Group 3 elements of Periodic Table and phosphorus oxides or phosphates of Group 3 elements of Periodic Table give a catalytic action at a relatively low temperature, the use thereof as a sintering agent results in rendering possible production of the diamond sintered body at lower pressure and lower temperature conditions than when using Mg or Ca carbonate as a sintering agent, as disclosed in, for example, Japanese Patent Laid-Open Publication No. 74766/1992. Namely, in such a case, a sufficiently tenacious sintered body can be obtained even at about 6 GPa and 1500° C.

In the diamond sintered body of the present invention, the content of a material consisting of a compound containing Group 3 element of Periodic Table and phosphorus is preferably adjusted to 0.1 to 30 volume %, since if less than 0.1 volume %, the bonding strength, i.e. sintering property among the diamond grains is deteriorated, while if more than 30 volume %, the strength and wear resistance are lowered by influences of the excessive phosphorus compound.

Synthetic diamond powders, and natural diamond powders, and polycrystalline diamond powders can be used as a raw material. The grain diameter of the powder is preferably in the range of 0.01 to 200 $\mu$m and depending on use thereof, various powders made even in fine grains or coarse grains or a mixture of fine grains and coarse grains can be used.

In place of these diamonds, non-diamond carbons such as graphite, glassy carbon, pyrolytic graphite can be used and mixtures of diamond and non-diamond graphites can of course be used.

In the diamond sintered body according to the present invention, diamond is present in a proportion of 50 to 99.9 volume %, since if less than 50 volume %, the wear resistance is inferior, while if more than 99.9 volume %, the sintering property is degraded. A preferred range thereof is 50 to 99.5 volume %, in particular, 70 to 99 volume %. As the diamond raw material, single crystal diamond powder (suitable for abrasive grains) or polycrystalline diamond powder can be used. The average grain diameter of these powders is preferably in the range of about 0.01 to 200 $\mu$m. On the other hand, the powder of the sintering binder has a grain diameter of about 0.01 to 30 $\mu$m, preferably about 0.1 to 10 $\mu$m, which is preferably smaller than that of the diamond powder, in particular, when it is mixed with diamond powder and sintered.

As a process for the production of the diamond sintered body according to the present invention, there can be used any one of the processes comprising (I) mixing a powder of at least one element (A) selected from the group consisting of rare earth elements, Group 3A, 3B, 4A, 4B and 6B elements of Periodic Table, iron group metals, Mn, V, alkali metals and alkaline earth metals, a powder of at least one oxide of the element (A) or at least one compound (D) containing the element (A), a powder of phosphorus or at least one phosphorus compound (B) and a powder of diamond or graphite, maintaining and sintering the resulting mixed powders under pressure and temperature conditions in the thermodynamically stable region of diamond, and (II) previously synthesizing a compound (C) of at least one element (A) selected from the group consisting of rare earth elements, Group 3A, 3B, 4A, 4B and 6B elements of Periodic Table, iron group metals, Mn, V, alkali metals and alkaline earth metals with at least one phosphorus compound (B) or a composite of the compound (C) and at least one oxide of the element (A), mixing a powder of the compound (C) or composite with a powder of diamond or graphite, maintaining and sintering the resulting mixed powders under pressure and temperature conditions in the thermodynamically stable region of diamond.

Furthermore, the sintering according to the present invention can also be carried out by a process comprising forming the compound (C) in the form of a thin piece or thin sheet, mixing it with diamond powder or graphite powder or bringing it into contact with diamond powder or graphite powder, maintaining them under pressure and temperature conditions in the thermodynamically stable region of diamond, and thereby infiltrating the diamond powder with the compound (C).

A further preferred embodiment of the process for the production of the diamond sintered body according to the present invention consists in (I) mixing the foregoing phosphorus compound powders, carbonate compound powders and oxide powder, adding diamond powder thereto, adequately mixing them and sintering the resulting mixed powders at an ultra-high pressure and high temperature, and (II) previously preparing a compound consisting of a phosphorus-carbonate compound or phosphate compound-carbonate compound and an oxide under normal pressure, pulverizing the compound, adequately mixing the resulting powder with diamond powder and sintering the mixture at an ultra-high pressure and high temperature. In addition, a further process can be employed comprising previously preparing a compound consisting of a phosphorus-carbonate compound or phosphate compound-carbonate compound and an oxide under normal pressure, pulverizing the compound, forming the resulting powder in a thin piece, thin sheet or sintered body holding plate, combining it with diamond or graphite powder, maintaining the assembly under pressure and temperature conditions in the thermodynamically stable region of diamond, thereby infiltrating the diamond powder with the compound.

As a further preferable embodiment of the process for the production of the diamond sintered body according to the present invention, there are two processes comprising (I) using a mixture of a rare earth element, phosphorus compound and diamond powders as a raw material and maintaining the mixture at an ultra-high pressure and high temperature and (II) previously reacting a rare earth metal with a phosphorus compound to form a rare earth metal-phosphorus compound, mixing with diamond powder and sintering the mixture.

A previously prepared compound of a rare earth element and phosphorus compound is pressed in a mold, combining it with diamond or graphite powder, maintaining the assembly in the diamond stable region and thereby infiltrating the diamond powder with the compound.

As a further preferable embodiment of the process for the production of the diamond sintered body according to the present invention, there are two processes comprising (I) mixing diamond powder or non-diamond carbon powder, with a mixture of a phosphate of Group 3 element of Periodic Table or hydrate thereof, a hydrogenphosphate of Group 3 element of Periodic Table or hydrate thereof or an oxide of Group 3 element of Periodic Table and phosphorus oxide or a phosphate of Group 3 element of Periodic Table and maintaining the mixture under pressure and temperature conditions in the thermodynamically stable region of diamond and (II) laminating a shaped body of diamond powder or a non-diamond graphite powder and a shaped body of a mixture of a phosphate of Group 3 element of Periodic Table or hydrate thereof, a hydrogenphosphate of Group 3 element of Periodic Table or hydrate thereof or an oxide of Group 3 element of Periodic Table and phosphorus oxide or a phosphate of Group 3 element of Periodic Table and maintaining the resulting laminate under pressure and temperature conditions in the thermodynamically stable region of diamond.

In the process comprising a raw material and sintering agent, the raw material and sintering agent are mechanically mixed by wet process or dry process and sintered at a high pressure and high temperature. Even in a case where the raw material powder is composed of fine grains, the sintering agent can uniformly be dispersed and production of a diamond sintered body with a thick shape is possible. For example, this process is suitable for the production of a cutting tool (fine grain sintered body) needing a good finished surface and a sintered body needing a thick shape such as dies. In the case of a raw material of coarse grains, however, it is difficult to uniformly mix the sintering agent.

On the other hand, in the process comprising laminating and arranging a raw material and sintering agent, plate-shaped bodies of a raw material and sintering agent are respectively prepared, laminated, contacted with each other and then subjected to a treatment at a high pressure and temperature, during which the sintering agent is diffused and impregnated through the raw material layer and the diamond grains are sintered. This process is particularly suitable for the production of a sintered body for a wear resistant tool or drill bit because of uniformly adding the sintering agent even when using a coarse grain raw material and thus obtaining a diamond sintered body with a high strength as well as high wear resistance in a stable manner.

According to the production process of the present invention, there can be obtained a diamond sintered body with a hardness of about 8000 kg/mm$^2$, preferably 8000 to 18000 kg/mm$^2$, which can be put to practical use, even when the sintering is carried out at a lower pressure and lower tempearture than when using carbonate solvents of the prior art, for example, a pressure of 5 GPa and a temperature of 1200 to 1500° C.

The diamond sintered body of the present invention is favorably used as an edge of a tool for cutting, polishing or excavating and after pulverizing, it is available as abrasive grains.

The present invention will now be illustrated in detail by the following Examples without limiting the same.

EXAMPLE 1

YPO$_4$ was used as a sintering agent. A synthetic diamond powder with a mean grain diameter of 3.5 μm and YPO$_4$ powder were adequately mixed in a proportion of 95 volume % and 5 volume % respectively, the mixture was charged in a Mo capsule, and maintained and sintered under pressure and temperature conditions of 7.5 GPa and 2000° C. for 15 minutes in an ultra-high pressure and high temperature producing apparatus of belt type. The resulting diamond sintered body was subjected to identification of the composition by X-ray diffraction to detect about 5 volume % of YPO$_4$ in addition to the diamond.

When the hardness of the sintered body was estimated by means of Knoop indentor, a high hardness, i.e. 7800 Kg/mm$^2$ was given. When the fracture toughness of the sintered body was measured by an indentation method and compared with that of a commercially available Co-binder sintered body, the former exhibited a relative toughness of about 1.3 times as large as the latter. When the resulting sintered body was heated at 1000° C. in vacuo and then subjected to measurement of the hardness and toughness, there were hardly found changes after this treatment.

EXAMPLE 2

Example 1 was repeated except using a mixture of Y$_2$O$_3$ and P$_2$O$_3$ in a proportion of 1:1 (by volume) as a sintering agent, adjusting the amount of this mixture to 5 volume % and adjusting the sintering pressure and temperature conditions to 6.5 GPa and 1750° C., thus preparing a diamond sintered body. The resulting sintered body contained YPO$_4$ and had the similar hardness, toughness and heat resistance to Example 1.

EXAMPLE 3

Example 1 was repeated except using a mixture of YPO$_4$ and P$_2$O$_3$ in a proportion of 1:2 (by volume) as a sintering agent, adjusting the amount of this mixture to 5 volume % and adjusting the sintering pressure and temperature conditions to 6.5 GPa and 1750° C., thus preparing a diamond sintered body. The resulting sintered body contained Y$_5$PO$_{10}$ and had the similar hardness, toughness and heat resistance to Example 1.

EXAMPLE 4

YPO$_4$ was used as a sintering agent. A synthetic diamond powder with a mean grain diameter of 15 μm and graphite powder with a mean grain diameter of 10 μm were adequately mixed in a proportion of 3:2 by volume and pressed in a mold to give a thickness of 2 mm, while YPO$_4$ powder was pressed in a mold to give a thickness of 1 mm. The thus plate-shaped bodies were alternately laminated, charged in a Mo capsule, and maintained and sintered under pressure and temperature conditions of 7.5 GPa and 2000° C. for 15 minutes in an ultra-high pressure and high temperature producing apparatus of belt type. The resulting diamond sintered body was subjected to identification of the composition by X-ray diffraction to detect about 2 volume % of YPO$_4$ in addition to the diamond.

When the hardness of the sintered body was estimated by means of Knoop indentor, a high hardness, i.e. about 8200 Kg/mm$^2$ was given. When the fracture toughness of the sintered body was measured by an indentation method and compared with that of a commercially available Co-binder sintered body, the former exhibited a relative toughness of about 1.4 times as large as the latter. When the resulting sintered body was heated at 1000° C. in vacuo and then subjected to measurement of the hardness and toughness, there were hardly found changes after this treatment.

EXAMPLES 5-1 TO 5-4 AND COMPARATIVE EXAMPLES 1-1 AND 1-2

17.2 g of Cerium dioxide (0.1 mol equivalent) and 70 g of potassium metaphosphate (0.4 mol equivalent) were mixed and heated and melted in a crucible. The mixture was cooled, solidified, dissolved in water and subjected to a treatment with hydrochloric acid, followed by obtaining cerium phosphate by filtration. The resulting cerium phosphate was pulverized in a grain size of about 1 to 2 μm in an agate mortar, mixed with diamond powder (abrasive grain of 30 μm in grain diameter) in a proportion as shown in Table 1, and maintained and sintered under pressure and temperature conditions of 6.5 GPa and 1600° C. for 30 minutes in an ultra-high pressure and high temperature producing apparatus of belt type. The resulting diamond sintered body was subjected to measurement of the hardness to result in results shown in Table 1.

TABLE 1

|  | Comparative Example 1-1 | Example 5-1 | 5-2 | 5-3 | 5-4 |
|---|---|---|---|---|---|
| Mixing Ratio of Cerium Phosphate (vol %) | 60 | 50 | 30 | 2 | 1 |
| Mixing Ratio of Diamond Powder (vol %) | 40 | 50 | 70 | 98 | 99 |
| Vickers Hardness (Kg/mm$^2$) | 6000 | 13000 | 15000 | 15000 | 7000 |

In Comparative Example 1-2, 30 volume % of calcium carbonate and 70 volume % of diamond powder were mixed and sintered under the same conditions as described above. The resulting sintered body had such a low hardness, i.e. 3200 Kg/mm$^2$ that it could not be applied to tools.

EXAMPLE 6

12.6 g of metallic lanthanum, 13.9 g of phosphorus oxide (P$_2$O$_5$) and diamond powder with a grain diameter of 30 μm were mixed, and maintained and sintered under pressure and temperature conditions of 6 GPa and 1500° C. for 40 minutes in an ultra-high pressure and high temperature producing apparatus of cubic anvil type. The resulting diamond sintered body was maintained in an inert gas (Ar) at 800° C. for 10 minutes and then subjected to examination by X-ray as to whether the diamond was converted into graphite (heat resistance test). The hardnesses before and after the heating were compared. The results are shown in Table 2.

Comparative Example 2

Example 6 was repeated except using Fe—Co alloy cemendite as a sintering agent instead of the lanthanum phosphate to obtain results as shown in Table 2:

TABLE 2

|  |  | Example 6 | Comparative Example 2 |
|---|---|---|---|
| Diamond Content (vol %) |  | 90 | 90 |
| Vickers Hardness (Kg/mm$^2$) | Before Heating | 15000 | 14000 |
|  | After Heating | 15000 | 6000 |
| Identification by X-ray | Graphite | not detected | detected |
|  | Main Binder Component | Lanthanum Phosphate | Fe—Co Alloy Cemendite |

It is apparent from the results of Table 2 that the diamond sintered body of the present invention maintains a high Vickers hardness not deteriorated even after the heating in the heat resistance test. On the other hand, in Comparative Example 2, the Vickers hardness after the heating is largely lowered and graphite was detected, which teaches that the sample for comparison is more inferior in heat resistance to that of the present invention.

EXAMPLE 7

The diamond sintered body obtained in Example 6 was worked in an insert shape for a cutting tool, which was then subjected to cutting of an aluminum alloy casting (Si content: 10 weight %). The cutting was smoothly conducted without breakage of the edge.

EXAMPLES 8-1 TO 8-4 AND COMPARATIVE EXAMPLES 3-1 AND 3-2

17.2 g of Cerium dioxide (0.1 mol equivalent) and 70 g of potassium metaphosphate (0.4 mol equivalent) were mixed and heated and melted in a crucible. The mixture was cooled, solidified, dissolved in water and subjected to a treatment with hydrochloric acid, followed by obtaining cerium phosphate by filtration. The resulting cerium phosphate was pulverized in a grain size of about 1 to 2 $\mu$m in an agate mortar, mixed with diamond powder (abrasive grain of 4 $\mu$m in grain diameter) in a proportion as shown in Table 3, and maintained and sintered under pressure and temperature conditions of 6.5 GPa and 1600° C. for 15 minutes in an ultra-high pressure and high temperature producing apparatus of belt type. The resulting diamond sintered body was subjected to measurement of the hardness to result in results shown in Table 3.

TABLE 3

|  | Comparative Example 3-1 | Example 8-1 | 8-2 | 8-3 | 8-4 |
|---|---|---|---|---|---|
| Mixing Ratio of Cerium Phosphate (vol %) | 60 | 50 | 30 | 2 | 0.5 |
| Mixing Ratio of Diamond Powder (vol %) | 40 | 50 | 70 | 98 | 99.5 |

TABLE 3-continued

|  | Comparative Example 3-1 | Example 8-1 | 8-2 | 8-3 | 8-4 |
|---|---|---|---|---|---|
| Knoop Hardness (Kg/mm$^2$) | 4200 | 7200 | 8200 | 8400 | 8000 |

In Comparative Example 3-2, 30 volume % of calcium carbonate and 70 volume % of diamond powder were mixed and sintered under the same conditions as described above. The resulting sintered body had such a low hardness, i.e. 3000 Kg/mm$^2$ that it could not be applied to tools.

EXAMPLE 9

12.6 g of metallic lanthanum, 13.9 g of phosphorus oxide (P$_2$O$_5$) and diamond powder with a grain diameter of 4 $\mu$m were mixed, and maintained and sintered under pressure and temperature conditions of 6 GPa and 1500° C. for 15 minutes in an ultra-high pressure producing apparatus of cubic anvil type. The resulting diamond sintered body was maintained in an inert gas (Ar) at 800° C. for 10 minutes and then subjected to examination by X-ray as to whether the diamond was converted into graphite (heat resistance test). The hardnesses before and after the heating were compared. The results are shown in Table 4.

Comparative Example 4

Example 9 was repeated except using Fe—Co alloy cemendite as a sintering agent instead of the lanthanum phosphate to obtain results as shown in Table 4:

TABLE 4

| | | Example 9 | Comparative Example 4 |
|---|---|---|---|
| Diamond Content (vol %) | | 90 | 90 |
| Vickers Hardness (Kg/mm$^2$) | Before Heating | 8400 | 7800 |
| | After Heating | 8400 | 2800 |
| Identification by X-ray | Graphite | not detected | detected |
| | Main Binder Component | Lanthanum Phosphate | Fe—Co Alloy Cemendite |

It is apparent from the results of Table 4 that the diamond sintered body of the present invention maintains a high Knoop hardness not deteriorated even after the heating in the heat resistance test. On the other hand, in Comparative Example 4, the Knoop hardness after the heating is largely lowered and graphite was detected, which teaches that the sample for comparison is more inferior in heat resistance to that of the present invention.

EXAMPLE 10

The diamond sintered body obtained in Example 9 was worked in an insert shape for a cutting tool, which was then subjected to cutting of an aluminum alloy casting (Si content: 25 weight %). The cutting was smoothly conducted without breakage of the edge.

EXAMPLE 11

Example 1 was repeated except using 5 volume % of $BPO_4$ as a sintering agent to obtain a sintered body containing $BPO_4$ and having a similar hardness, toughness and heat resistance to Example 1.

EXAMPLE 12

Example 1 was repeated except using 5 volume % of $AlPO_4$ as a sintering agent to obtain a sintered body containing $AlPO_4$ and having a similar hardness, toughness and heat resistance to Example 1.

EXAMPLE 13

Example 1 was repeated except using 5 volume % of $AlPO_4.2H_2O$ as a sintering agent and adjusting the sintering pressure and temperature conditions to 6.5 GPa and 1650° C. to obtain a sintered body containing $AlPO_4$ and having a similar hardness, toughness and heat resistance to Example 1.

EXAMPLE 14

Example 1 was repeated except using 5 volume % of $Al(H_2PO_4)$, as a sintering agent and adjusting the sintering pressure and temperature conditions to 6.5 GPa and 1650° C. to obtain a sintered body containing $AlPO_4$ and having a similar hardness, toughness and heat resistance to Example 1.

EXAMPLE 15

Example 1 was repeated except using 5 volume % of $Al(H_2PO_4)_3.3/2H_2O$ as a sintering agent and adjusting the sintering pressure and temperature conditions to 6.5 GPa and 1650° C. to obtain a sintered body containing $AlPO_4$ and having a similar hardness, toughness and heat resistance to Example 1.

EXAMPLE 16

$BPO_4$ was used as a sintering agent. A plate-shaped sintered body with a thickness of 2 mm, consisting of high purity isotropic graphite powder with a mean grain diameter of 3 µm and $BPO_4$ powder, pressed in a mold to give a thickness of 1 mm, were alternately laminated, charged in a Mo capsule, and maintained and sintered under pressure and temperature conditions of 7.5 GPa and 2000° C. for 15 minutes in an ultra-high pressure and high temperature producing apparatus of girdle type. The resulting diamond sintered body was subjected to identification of the composition by X-ray diffraction to detect about 3 volume % of $BPO_4$ in addition to the diamond.

When the hardness of the sintered body was estimated by means of Knoop indentor, a high hardness, i.e. about 8000 Kg/mm$^2$ was given. When the fracture toughness of the sintered body was measured by an indentation method and compared with that of a commercially available Co-binder sintered body, the former exhibited a relative toughness of about 1.3 times as large as the latter. When the resulting sintered body was heated at 1000° C. in vacuo and then subjected to measurement of the hardness and toughness, there were hardly found changes after this treatment.

Comparative Example 5

Example 1 was repeated except using $BPO_4$ as a sintering agent and adding a very small amount of $BPO_4$ powder (about 0.05 volume %) to a synthetic diamond powder with a mean grain diameter of 3.5 µm and adequately mixing them to prepare a raw material. However, there remained non-sintered parts in the resulting sintered body.

Comparative Example 6

Example 1 was repeated except using $AlPO_4$ as a sintering agent and adding about 60 volume % of a synthetic diamond powder with a mean grain diameter of 3.5 µm to 40 volume % of $AlPO_4$ powder and adequately mixing them to prepare a raw material. However, the resulting diamond sintered body had insufficient bonding of the grains with each other and a low hardness, i.e. 3500 Kg/mm$^2$.

EXAMPLE 17-1

0.2 mol equivalent of sodium hydrogenphosphate ($Na_2HPO_4$) was added to a solution of 0.2 mol equivalent of cerous chloride, heated to precipitate $CePO_4.(H_2O)_3$ and taken by filtering. To the precipitate was added 0.3 mol equivalent of a powder of AlCe alloy was added and heated to form $CeAl_3(PO_4)_2.(OH)_6$. 10 volume % of the thus resulting compound in the form of powder and 90 volume % of diamond powder with a grain size of 30 µm were mixed, the resulting mixed powders, as a raw material, were maintained and sintered under pressure and temperature conditions of 5.8 GPa and 1400° C. in an ultra-high pressure producing reactor. The resulting diamond sintered body exhibited a Vickers hardness of 14000 Kg/mm$^2$, which taught that the sintering proceeded sufficiently.

When the diamond sintered body was worked in a shape of cutting tool and then subjected to milling of an Al-Si alloy (cutting speed: 500 m/min and cutting depth: 0.1 mm), it was confirmed that the product had a sufficient cutting property and excellent breakage resistance.

EXAMPLE 17-2

In Example 17-1, a mixing ratio (mole ratio) of the AlCe alloy and CePO$_4$.(H$_2$O)$_3$ was variably changed and subjected to a heat treatment to form compounds represented by CeAl$_x$(PO$_4$)$_y$(OH)$_z$ in which:

$1 \leq x \leq 4.5$, $1 \leq y \leq 5$ and $1 \leq z \leq 26$

Each of the resulting products was powdered. To 10 volume % of this powder was added 90 volume % of diamond powder with a grain diameter of 30 μm and the mixed powders were maintained and sintered under pressure and temperature conditions of 5.8~6.0 GPa and 1400~1450° C. in an ultra-high pressure producing apparatus, thus obtaining a high hardness diamond sintered body with a Vickers hardness of 13000 to 15000 Kg/mm$^2$.

EXAMPLE 18-1

Lanthanum dioxide was mixed with potassium metaphosphate and sodium and melted, which was then subjected to an acid treatment to remove NaLaP$_2$O$_7$, and LaPO$_4$ was then obtained. Lanthanum sodium hydrogenphosphate [NaLaH(PO$_4$)$_2$] was thermally decomposed to form 3CeO$_2$.P$_2$O$_5$.3H$_2$O. Furthermore, sodium phosphate and lanthanum nitrate were reacted to form La$_4$(P$_2$O$_7$)$_3$.12H$_2$O.

The mixing ratios of the three phosphated lanthanums and the addition amount of a GaLa alloy were variably changed to prepare LaGa$_3$(P$_a$O$_b$)$_2$(OH)$_6$. This compound could be synthesized only when a=1 or 2 and b=2, 3, 4, 5 or 7 and was not synthesized in the case of the other ratios.

Each of the resulting products was powdered. To 20 volume % of this powder was added 80 volume % of diamond powder with a grain diameter of 30 μm and the mixed powders, as a raw material powder, were maintained and sintered under pressure and temperature conditions of 5.7 GPa and 1400° C. for 1 hour in an ultra-high pressure producing apparatus, thus obtaining a diamond sintered body with a Vickers hardness of 14000 Kg/mm$^2$.

It was found that the resulting sintered body was not so corroded with acids or alkalies and had a high corrosion resistance.

EXAMPLE 18-2

To 1 volume % of each powder of LaGa$_3$(P$_a$O$_b$)$_2$(OH)$_6$ obtained in Example 18-1 was added 99 volume % of diamond powder (average grain size: 2 μm), adequately mixed, the mixture as a raw material was charged in a capsule and maintained and sintered under pressure and temperature conditions of 6 GPa and 1500° C. for 1 hour, thus obtaining a diamond sintered body with a Vickers hardness of 8000 Kg/mm$^2$ in each case.

Moreover, to 50 volume % of each powder of LaGa$_3$(P$_a$O$_b$)$_2$(OH)$_6$ obtained in Example 18-1 was added 50 volume % of diamond powder (average grain size: 30 μm), adequately mixed, pressed in a disk shape and then subjected to sintering under the same conditions as described above, thus obtaining a diamond sintered body with a Vickers hardness of 8000 Kg/mm$^2$ in each case.

EXAMPLE 19

CePO$_4$.(H$_2$O)$_3$ prepared in Example 17-1, Nd$_2$O$_3$(P$_2$O$_5$)$_2$ obtained by thermal decomposition of NdHPO$_4$.3H$_2$O, and CaO and GeS were respectively powdered and adequately mixed in a proportion of 3:3:3:1 by volume. 1 volume % of the mixed powders was further mixed with 99 volume % of diamond powder with a grain diameter of 30 μm, pressed in a disk-shape and then maintained and sintered under pressure and temperature conditions of 5.5 GPa and 1350° C. for 50 minutes in an ultra-high pressure producing apparatus, thus obtaining a diamond sintered body with a Vickers hardness of 15000 Kg/mm$^2$.

When the resulting sintered body was heated in vacuo at 1200° C., cooled and then subjected to measurement of the Vickers Hardness again, it was still 15000 Kg/mm$^2$, telling that the diamond sintered body had a high heat resistance.

EXAMPLE 20-1

0.2 mol equivalent of sodium hydrogenphosphate (Na$_2$HPO$_4$) was added to a solution of 0.2 mol equivalent of cerous chloride, heated to precipitate CePO$_4$.(H$_2$O)$_3$ and taken by filtering. To the precipitate was added 0.3 mol equivalent of a powder of AlCe alloy was added and heated to form CeAl$_3$(PO$_4$)$_2$.(OH)$_6$. 5 volume % of the thus resulting compound in the form of powder and 95 volume % of diamond powder with a grain size of 4 μm were mixed, the resulting mixed powders, as a raw material, were maintained and sintered under pressure and temperature conditions of 5.8 GPa and 1400° C. in an ultra-high pressure producing apparatus. The resulting diamond sintered body exhibited a Knoop hardness of 8200 Kg/mm$^2$, which taught that the sintering proceeded sufficiently.

When the diamond sintered body was worked in a shape of cutting tool and then subjected to milling of an Al—Si alloy (cutting speed: 500 m/min and cutting depth: 0.1 mm), it was confirmed that the product had a sufficient cutting property and excellent breakage resistance.

EXAMPLE 20-2

In Example 20-1, a mixing ratio (mole ratio) of the AlCe alloy and CePO$_4$. (H$_2$O)$_3$ was variably changed and subjected to a heat treatment to form compounds represented by CeAl$_x$(PO$_4$)$_y$(OH)$_z$ in which:

$1 \leq x \leq 4.5$, $1 \leq y \leq 5$ and $1 \leq z \leq 26$

Each of the resulting products was powdered. To 5 volume % of this powder was added 95 volume % of diamond powder with a grain diameter of 4 μm and the mixed powders were maintained and sintered under pressure and temperature conditions of 5.8~6.0 GPa and 1400~1450° C. in an ultra-high pressure producing apparatus, thus obtaining a high hardness diamond sintered body with a Knoop hardness of 8000 to 9000 Kg/mm$^2$.

EXAMPLE 21-1

Lanthanum dioxide was mixed with potassium metaphosphate and sodium and melted, which was then subjected to an acid treatment to remove NaLaP$_2$O$_7$, and LaPO$_4$ was then obtained. Lanthanum sodium hydrogenphosphate [NaLaH $(PO_4)_2]$ was thermally decomposed to form $3CeO_2.P_2O_5.3H_2O$. Furthermore, sodium phosphate and lanthanum nitrate were reacted to form $La_4(P_2O_7)_3.12H_2O$.

The mixing ratios of the three phosphated lanthanums and the addition amount of a GaLa alloy were variably changed to prepare $LaGa_3(P_aO_b)_2(OH)_6$. This compound could be synthesized only when a=1 or 2 and b=2, 3, 4, 5 or 7 and was not synthesized in the case of the other ratios.

Each of the resulting products was powdered. To 10 volume % of this powder was added 90 volume % of diamond powder with a grain diameter of 4 μm and the mixed powders, as a raw material powder, were maintained and sintered under pressure and temperature conditions of 5.7 GPa and 1400° C. for 15 minutes in an ultra-high pressure producing apparatus, thus obtaining a diamond sintered body with a Knoop hardness of 8200 Kg/mm².

It was found that the resulting sintered body was not so corroded with acids or alkalies and had a high corrosion resistance.

EXAMPLE 21-2

To 0.5 volume % of each powder of $LaGa_3(P_aO_b)_2(OH)_6$ obtained in Example 21-1 was added 99.5 volume % of diamond powder (average grain size: 2 μm), adequately mixed, the mixture as a raw material was charged in a capsule and maintained and sintered under pressure and temperature conditions of 6 GPa and 1500° C. for 15 minutes in an ultra-high pressure and high temperature producing apparatus, thus obtaining a diamond sintered body with a Knoop hardness of 8600 Kg/mm².

Moreover, to 50 volume % of each powder of $LaGa_3(P_aO_b)_2(OH)_6$ obtained in Example 21-1 was added 50 volume % of diamond powder (average grain size: 30 μm), adequately mixed, pressed in a disk shape and then subjected to sintering under the same conditions as described above, thus obtaining a diamond sintered body with a Knoop hardness of 7000 Kg/mm² in each case.

EXAMPLE 22

$CePO_4.(H_2O)_3$ prepared in Example 20-1, $Nd_2O_3(P_2O_5)_2$ obtained by thermal decomposition of $NdHPO_4.3H_2O$, and CaO and GeS were respectively powdered and adequately mixed in a proportion of 3:3:3:1 by volume. 1 volume % of the mixed powders was further mixed with 99 volume % of diamond powder with a grain diameter of 4 μm, pressed in a disk-shape and then maintained and sintered under pressure and temperature conditions of 5.5 GPa and 1350° C. for 15 minutes in an ultra-high pressure producing apparatus, thus obtaining a diamond sintered body with a Knoop hardness of 8400 Kg/mm².

When the resulting sintered body was heated in vacuo at 1200° C., cooled and then subjected to measurement of the Knoop Hardness again, it was hardly changed, telling that the diamond sintered body had a high heat resistance.

EXAMPLE 23

$(NH_4)_2Ce(NO_3)_6.H_2O$ and $Na_2HPO_4.12H_2O$ were reacted in an aqueous solution to precipitate and synthesize $Ce_3(PO_4)_4.8H_2O$. The resulting compound was dried and mixed with $CaCO_3$ powder and $Fe_2O_3$ powder in a proportion of 7:2:1 by volume. 95 volume % of diamond powder with a grain size of 5 μm was well mixed with 5 volume % of the resulting mixed powders to prepare a raw material powder. The raw material powder was pressed in a mold and maintained at 5.5 GPa and 1300° C. for 30 minutes in an ultra-high pressure reactor, thus obtaining a diamond sintered body being well sintered and having a Vickers hardness of 15000 Kg/mm².

When the resulting sintered body was heated in $N_2$ atmosphere at 1200° C. for 30 minutes, cooled and then subjected to measurement of the Vickers hardness again, it was hardly changed to give 15000 Kg/mm², telling that the diamond sintered body had a high heat resistance.

EXAMPLE 24

$(NH_4)_2Ce(NO_3)_6.H_2O$ and $Na_2HPO_4.12H_2O$ were reacted in an aqueous solution to precipitate and synthesize $Ce_3(PO_4)_4.8H_2O$. The resulting compound was dried and mixed with $CaCO_3$ powder and $Fe_2O_3$ powder in a proportion of 5:3:2 by volume. 97 volume % of diamond powder with a grain size of 1–2 μm was well mixed with 3 volume % of the resulting mixed powders to prepare a raw material powder. The raw material powder was pressed in a mold and maintained at 5.5 GPa and 1300° C. for 15 minutes in an ultra-high pressure reactor, thus obtaining a diamond sintered body being well sintered and having a Knoop hardness of 8200 Kg/mm².

When the resulting sintered body was heated in $N_2$ atmosphere at 1200° C. for 30 minutes, cooled and then subjected to measurement of the Knoop hardness again, it was hardly changed to give 8200 Kg/mm², telling that the diamond sintered body had a high heat resistance.

EXAMPLE 25

A diamond sintered body was prepared in the same manner as in Example 24 except igniting $CeHP_2O_7.3H_2O$ in place of $(NH_4)_2Ce(NO_3)_6.H_2O$ to obtain $Ce_2O_3.2P_2O_5$ and using the same instead of $Ce_3(PO_4)_4.8H_2O$. Similar results were obtained to Example 24.

EXAMPLE 26

In Example 23, $LaPO_4.5H_2O$ and $SrCO_3$ were mixed and heated to synthesize $La_3Sr_2(CO_3)_2(PO_4)_3$. This compound was powdered and well mixed with CaO powder in a proportion of 8:2 by volume. 0.5 volume % of the mixed powders was added to 99.5 volume % of diamond powder, well mixed and pressed in a mold. The pressed body was maintained and sintered under pressure and temperature conditions of 5.2 GPa and 1200° C. for 60 minutes in an ultra-high pressure reactor, thus obtaining a diamond sintered body being well sintered and having a Vickers hardness of 18000 Kg/mm².

The resulting diamond sintered body was worked in a circular insert, brazed to a base metal and subjected to cutting of sandstone or shale under a cutting condition of 100 m/min. The cutting was conducted without chipping and it was thus confirmed that the sintered body was excellent in breakage resistance.

50 volume % of the above described $La_3Sr_2(CO_3)_2(PO_4)_3$ powder and 50 volume % of diamond powder with a grain diameter of 20 μm were mixed and sintered under the same conditions as described above to obtain a sintered body having a Vickers hardness of 8000 Kg/mm².

EXAMPLE 27

In Example 24, $LaPO_4.5H_2O$ and $SrCO_3$ were mixed and heated to synthesize $La_3Sr_2(CO_3)_2(PO_4)_3$. This compound was powdered and well mixed with CaO powder in a proportion of 6:4 by volume. 0.2 volume % of the mixed powders was added to 99.8 volume % of diamond powder, well mixed and pressed in a mold. The pressed body was maintained and sintered under pressure and temperature conditions of 5.2 GPa and 1200° C. for 15 minutes in an ultra-high pressure reactor, thus obtaining a diamond sintered body being well sintered and having a Knoop hardness of 8600 Kg/mm$^2$.

The resulting diamond sintered body was worked in a circular insert, brazed to a base metal and subjected to cutting of sandstone or shale under a cutting condition of 100 m/min. The cutting was conducted without chipping and it was thus confirmed that the sintered body was excellent in breakage resistance.

50 volume % of the above described $La_3Sr_2(CO_3)_2(PO_4)_3$ powder and 50 volume % of diamond powder with a grain diameter of 20 μm were mixed and sintered under the same conditions as described above to obtain a sintered body having a Knoop hardness of 7400 Kg/mm$^2$.

EXAMPLE 28

The procedures of Example 26 was repeated except using an alkali metal carbonate, i.e. $Na_2CO_3$ and an alkaline earth carbonate, i.e. $BaCO_3$ in place of $SrCO_3$ to prepare a diamond sintered body of the present invention. When the resulting sintered body was worked in an insert and subjected to a cutting test in the similar manner, it was confirmed that this sample was also excellent in breakage resistance.

EXAMPLE 29

$Nd_2O_3 \cdot 2P_2O_5$, $CaCO_3$, $SrCO_3$, $Na_2SO_2$ and $SiO_2$ were mixed and heated to obtain a composite phase of $Nd_2Ca_3CO_3(PO_4)_3$, $CO_3(PO_4)_3$ and oxides. The resulting composite phase was pulverized to obtain a powder. 10 volume % of the powder was well mixed with 90 volume % of diamond powder with a grain size of 8 μm, the resulting mixed powders were pressed in a mold and the pressed body was maintained and sintered under pressure and temperature conditions of 5.4 GPa and 1350° C. for 30 minutes in an ultra-high pressure reactor, thus obtaining a diamond sintered body being well sintered and having a Vickers hardness of 14500 Kg/mm$^2$.

It was found that the resulting sintered body was not so corroded with acids or alkalies and had a high corrosion resistance.

EXAMPLE 30

$Nd_2O_3 \cdot 2P_2O_5$, $CaCO_3$, $SrCO_3$, $Na_2SO_2$ and $SiO_2$ were mixed and heated to obtain a composite phase of $Nd_2Ca_3CO_3(PO_4)_3$, $CO_3(PO_4)_3$ and oxides. The resulting composite phase was pulverized to obtain a powder. 5 volume % of the powder was well mixed with 95 volume % of diamond powder with a grain size of 5 μm, the resulting mixed powders were pressed in a mold and the pressed body was maintained and sintered under pressure and temperature conditions of 5.4 GPa and 1350° C. for 15 minutes in an ultra-high pressure reactor, thus obtaining a diamond sintered body being well sintered and having a Knoop hardness of 8000 Kg/mm$^2$.

It was found that the resulting sintered body was not so corroded with acids or alkalies and had a high corrosion resistance.

EXAMPLE 31

The diamond sintered bodies obtained in Examples 18-2 and 21-2 were pulverized to form abrasive grains with an average grain diameter of 30 μm When a flat plate of gaseous phase diamond was lapped using the resulting abrasive grains, the lapping was favorably conducted.

EXAMPLE 32

The diamond sintered body obtained in Example 29 was pulverized to form abrasive grains with an average grain diameter of 20 μm. When a flat plate of gaseous phase diamond was lapped using the resulting abrasive grains, the lapping was favorably conducted.

EXAMPLE 33

The cerium phosphate powder (1~2 μm) prepared in an analogous manner to Example 5 and synthetic diamond powder with a mean grain diameter of 15 μm were respectively shaped in plates of 1 mm and 2 mm in thickness, alternately laminated, charged in a Mo capsule and maintained and sintered under pressure and temperature conditions of 6.5 GPa and 1600° C. for 15 minutes in an ultra-high pressure producing apparatus of belt type. The resulting diamond sintered body was subjected to identification of the composition by X-ray diffraction to detect about 2 volume % of cerium phosphate in addition to the diamond.

When the hardness of the sintered body was estimated by means of Knoop indentor, a high hardness, i.e. 8200 Kg/mm$^2$ was given.

When using a powder of a mixture of diamond powder and graphite powder in a proportion of 1:5 by volume in place of the synthetic diamond powder, the hardness was 8000 Kg/mm$^2$.

EXAMPLE 34

Example 33 was repeated except using $CeAl_3(PO_4)_2 \cdot (OH)_6$ prepared in an analogous manner to Example 17-1 in place of cerium phosphate, thus preparing a diamond sintered body having a Knoop hardness of 8400 Kg/mm$^2$.

EXAMPLE 35

Example 33 was repeated except using $LaGa_3(P_aO_b)_2 (OH)_6$ prepared in an analogous manner to Example 18-1 in place of cerium phosphate, thus preparing a diamond sintered body having a Knoop hardness of 8000 Kg/mm$^2$.

ADVANTAGES OF THE INVENTION

As illustrated above, according to the present invention, there can be provided an improved diamond sintered body having an excellent breakage resistance, corrosion resistance, heat resistane and wear resistance and capable of being sintered at a relatively low pressure and low temperature, which has been impossible up to the present time. This surely results in reduction of the production cost of the diamond sintered body and contributes to development of an industrial technique. Another feature of the diamond sintered body of the present invention consists in a high electric resistance, e.g. at least $10^4$ Ωcm. In particular, tools using the diamond sintered body of the present invention and abrasive grains obtained by pulverizing the diamond sintered body are favorably applied to industrial uses because of the above described excellent properties.

What is claimed is:

1. A sintered diamond body comprising 50 to 99.9 volume % of diamond and a balance of a binder phase consisting of a compound or composite of a phosphorus oxide and at least one element selected from the group consisting of rare earth elements, Group 3A, 3B, 4A, 4B, and 6B elements of the Periodic Table, iron group, Mn, V, alkali metals, alkaline earth metals and mixtures thereof, and, optionally, an oxide of at least one of said elements.

2. A diamond sintered body comprising 50 to 99.9 volume % of diamond and a balance of a binder phase predominantly consisting of a rare earth element and a phosphorus oxide.

3. The diamond sintered body, as claimed in claim 1, wherein the phosphorus oxide is represented by $P_aO_b$ in which a is 1 or 2 and b is 2, 3, 4, 5 or 7.

4. The diamond sintered body, as claimed in claim 1, wherein the compound or composite is represented by $MN_x(P_aO_b)_y(OH)_z$ in which M is a simple substance or solid solution of at least one element selected from the group consisting of rare earth elements, alkaline earth metals and Group 4B elements of Periodic Table and N is a simple substance or solid solution of at least one element selected from the group consisting of Group 3B elements of Periodic Table, and x, y and z are respectively in the range of $1 \leq x \leq 4.5$, $1 \leq y \leq 5$ and $1 \leq z \leq 26$.

5. The diamond sintered body, as claimed in claim 1, wherein the binder phase is composed of a compound or composite of the at least one element with a phosphorus oxide represented by $P_aO_b$ in which a is 1 or 2 and b is 2, 3, 4, 5 or 7 and an oxide of the at least one element.

6. The diamond sintered body, as claimed in any one of claims 1, 2 or 3 wherein the binder phase is composed of a compound or composite represented by the formula $MN_x(P_aO_b)_y(OH)_z$ in which M is a simple substance or solid solution of at least one element selected from the group consisting of rare earth elements, alkaline earth metals and Group 4B elements of Periodic Table and N is a simple substance or solid solution of at least one element selected from the group consisting of Group 3B elements of Periodic Table, and x, y and z are respectively in the range of $1 \leq x \leq 4.5$, $1 \leq y \leq 5$ and $1 \leq z \leq 26$, with an oxide of at least one element selected from the group consisting of rare earth elements, Group 3A, 3B, 4A, 4B and 6B elements of Periodic Table, iron group metals, Mn, V, alkali metals and alkaline earth metals.

7. A diamond sintered body comprising 50 to 99.9 volume % of diamond and a balance of a binder phase predominantly comprising a phosphorus oxide and carbonate compound.

8. The diamond sintered body, as claimed in claim 7, wherein the binder phase is composed of a mixed phase consisting of comprising a phosphorus oxide and carbonate compound, and an oxide.

9. The diamond sintered body, as claimed in claim 7 or 8, wherein the binder phase is composed of a mixed phase consisting of a phosphorus-carbonate compound or phosphorus oxide-carbonate compound, obtained from a phosphorus oxide and carbonate compound, and an oxide.

10. The diamond sintered body, as claimed in claim 7 or 8, wherein the phosphorus oxide contains at least one element selected from the group consisting of rare earth elements, alkali metals, alkaline earth metals, Group 3B, 4B and 6B elements of Periodic Table.

11. The diamond sintered body, as claimed in claim 7 or 8, wherein the carbonate compound contains at least one element selected from the group consisting of rare earth elements, alkali metals, alkaline earth metals, Mn and V.

12. The diamond sintered body, as claimed in claim 7 or 8, wherein the phosphorus oxide and carbonate compound contains at least one element selected from the group consisting of rare earth elements, alkali metals, alkaline earth metals, Group 3B, 4B and 6B elements of Periodic Table.

13. The diamond sintered body, as claimed in claim 8, wherein the oxide is an oxide of at least one element selected from the group consisting of rare earth elements, alkali metals, alkaline earth metals, Group 3B, 4B, 6B and 4A elements of Periodic Table, iron group metals, Mn and V.

14. The diamond sintered body, as claimed in claims 7 or 8, wherein the binder phase is an apatite represented by $M_x[N_yCO_3(P_aO_b)_z]$ in which M is a single element or solid solution of at least one element selected from the group consisting of rare earth elements, alkali elements, alkaline earth elements, Pb, Mn and V, and N is at least one element or oxide, selected from the group consisting of rare earth elements, Group 3B, 4B and 6B elements of Periodic Table and oxides of Group 4A elements of Periodic Table or oxides of metallic elements, and x, y and z are respectively in the range of $1 \leq x \leq 7$, $1 \leq y \leq 6$, and $1 \leq z \leq 6$, a is 1 or 2 and b is 2, 3, 4, 5 or 7.

15. The diamond sintered body, as claimed in claim 9, wherein the phosphorus oxide contains at least one element selected from the group consisting of rare earth elements, alkali metals, alkaline earth metals, Group 3B, 4B and 6B elements of Periodic Table.

16. The diamond sintered body, as claimed in claim 9, wherein the carbonate compound contains at least one element selected from the group consisting of rare earth elements, alkali metals, alkaline earth metals, Mn and V.

17. The diamond sintered body, as claimed in claim 10, wherein the carbonate compound contains at least one element selected from the group consisting of rare earth elements, alkali metals, alkaline earth metals, Mn and V.

18. The diamond sintered body, as claimed in claim 9, wherein the phosphorus oxide and carbonate compound contains at least one element selected from the group consisting of rare earth elements, alkali metals, alkaline earth metals, Group 3B, 4B and 6B elements of Periodic Table.

19. The diamond sintered body, as claimed in claim 10, wherein the phosphorus oxide and carbonate compound contains at least one element selected from the group consisting of rare earth elements, alkali metals, alkaline earth metals, Group 3B, 4B and 6B elements of Periodic Table.

20. The diamond sintered body, as claimed in claim 11, wherein the phosphorus oxide and carbonate compound contains at least one element selected from the group consisting of rare earth elements, alkali metals, alkaline earth metals, Group 3B, 4B and 6B elements of Periodic Table.

21. The diamond sintered body, as claimed in claim 9, wherein the oxide is an oxide of at least one element selected from the group consisting of rare earth elements, alkali metals, alkaline earth metals, Group 3B, 4B, 6B and 4A elements of Periodic Table, iron group metals, Mn and V.

22. A diamond sintered body comprising 0.1 to 30 volume % of a material consisting of a compound containing at least one Group 3A and/or 3B element of Periodic Table and phosphorus and a balance of diamond.

23. The diamond sintered body, as claimed in claim 22, wherein said compound consists of an oxide of Group 3A and/or 3B element of at least one Periodic Table and phosphorus oxide.

24. The diamond sintered body, as claimed in claim 22 or 23, wherein said compound is a phosphate of at least one Group 3A and/or 3B element of Periodic Table.

25. The diamond sintered body, as claimed in claim 22 or 23, wherein the Group 3A and/or 3B elements of Periodic Table are B, Al and/or Y.

26. The diamond sintered body, as claimed in claim 24, wherein the Group 3A and/or 3B elements of Periodic Table are B, Al and/or Y.

27. A diamond sintered body tool for cutting, lapping and excavating, comprising the diamond sintered body as claimed in any one of claims 1, 2–4, 7, 8, 13, 22 or 23 as an edge.

28. Abrasive grains obtained by pulverizing a sintered diamond body comprising 50 to 99.9 volume % of diamond and a balance of a binder phase consisting of a compound or composite of a phosphorus oxide and at least one element selected from the group consisting of rare earth elements, Group 3A, 3B, 4A, 4B, and 6B elements of the Periodic Table, iron group, Mn, V, alkali metals, alkaline earth metals and mixtures thereof, and, optionally, an oxide of at least one of said elements.

29. Abrasive grains obtained by pulverizing a diamond sintered body comprising 50 to 99.9 volume % of diamond and a balance of a binder phase predominantly consisting of a rare earth element and a phosphorus oxide.

30. The abrasive grains as claimed in claim 28, wherein the phosphorus oxide is represented by $P_aO_b$ in which a is 1 or 2 and b is 2, 3, 4, 5 or 7.

31. The abrasive grains as claimed in claim 28, wherein the compound or composite is represented by $MN_x(P_aO_b)_y(OH)_z$ in which M is a simple substance or solid solution of at least one element selected from the group consisting of rare earth elements, alkaline earth metals and Group 4B elements of Periodic Table and N is a simple substance or solid solution of at least one element selected from the group consisting of Group 3B elements of Periodic Table, and x, y and z are respectively in a range of $1 \leq x \leq 4.5$, $1 \leq y \leq 5$ and $1 \leq z \leq 26$.

32. Abrasive grains obtained by pulverizing a diamond sintered body comprising 50 to 99.9 volume % of diamond and a balance of a binder phase predominantly comprising a phosphorus oxide and carbonate compound.

33. The abrasive grains as claimed in claim 32, wherein the binder phase is composed of a mixed phase consisting of a phosphorus oxide and carbonate compound, and an oxide.

34. The abrasive grains as claimed in claim 33, wherein the oxide is an oxide of at least one element selected from the group consisting of rare earth elements, alkali metals, alkaline earth metals, Group 3B, 4B, 6B and 4A elements of Periodic Table, iron group metals, Mn and V.

35. Abrasive grains obtained by pulverizing a diamond sintered body comprising 0.1 to 30 volume % of a material consisting of a compound containing at least one Group 3A and/or 3B element of Periodic Table and phosphorus and a balance of diamond.

36. The abrasive grains as claimed in claim 35, wherein said compound consists of an oxide of at least one Group 3A and/or 3B element of Periodic Table and phosphorus oxide.

* * * * *